United States Patent
Herman

(10) Patent No.: US 7,848,879 B2
(45) Date of Patent: Dec. 7, 2010

(54) SURVIVABILITY SYSTEM

(75) Inventor: Carl R. Herman, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 939 days.

(21) Appl. No.: 11/634,230

(22) Filed: Dec. 4, 2006

(65) Prior Publication Data

US 2008/0133070 A1    Jun. 5, 2008

(51) Int. Cl.
*G06F 19/00*    (2006.01)
(52) U.S. Cl. .................................. 701/200; 701/3
(58) Field of Classification Search ............. None
See application file for complete search history.

(56) References Cited

U.S. PATENT DOCUMENTS

| | | | |
|---|---|---|---|
| 4,812,990 A | 3/1989 | Adams et al. | |
| 4,947,350 A | 8/1990 | Murray et al. | |
| 5,086,396 A | 2/1992 | Waruszewski, Jr. | |
| 5,526,260 A * | 6/1996 | Kodet et al. | 702/2 |
| 5,631,640 A | 5/1997 | Deis et al. | |
| 6,097,996 A | 8/2000 | Deker | |
| 6,163,744 A | 12/2000 | Onken et al. | |
| 6,182,007 B1 | 1/2001 | Szczerba | |
| 6,222,464 B1 | 4/2001 | Tinkel et al. | |
| 6,259,988 B1 | 7/2001 | Galkowski et al. | |
| 6,269,301 B1 | 7/2001 | Deker | |
| 6,401,038 B2 | 6/2002 | Gia | |
| 6,529,821 B2 | 3/2003 | Tomasi et al. | |
| 6,577,947 B1 | 6/2003 | Kronfeld et al. | |
| 6,734,824 B2 | 5/2004 | Herman | |
| 6,985,810 B2 | 1/2006 | Moitra et al. | |
| 7,024,287 B2 | 4/2006 | Peckham et al. | |
| 7,233,859 B2 * | 6/2007 | Lundberg | 701/200 |
| 2004/0028270 A1 | 2/2004 | Herman | |
| 2004/0030463 A1 | 2/2004 | Stockdale | |
| 2004/0146048 A1 | 7/2004 | Cotte | |
| 2005/0267652 A1 * | 12/2005 | Allstadt et al. | 701/9 |
| 2006/0116814 A1 | 6/2006 | Milbert | |
| 2006/0184294 A1 | 8/2006 | Ma | |

OTHER PUBLICATIONS

U.S. Herman et al. U.S. Appl. No. 11/138,601, filed May 26, 2005 for Optimized Weapons Release Management System.
U.S. Herman et al. U.S. Appl. No. 11/137,915, filed May 26, 2005 for Survivability /Attack Planning System.

(Continued)

*Primary Examiner*—Michael J. Zanelli
(74) *Attorney, Agent, or Firm*—Tarolli, Sundheim, Covell & Tummino LLP

(57) ABSTRACT

A system determines a course of action for a vehicle. The system includes an altitude module, a threat detection module, a route module, and a threat avoidance module. The altitude module contains a list of types of threats. The list includes a predetermined threshold time for maximum safe visibility by the vehicle for each type. The threat detection module detects threats. The route module stores a planned route for the vehicle. The threat avoidance module determines types of threats detected by the threat detection module. The threat avoidance module utilizes the predetermined threshold times from the altitude module for each threat detected by the threat detection module to determine whether the planned route may safely enter visibility range of each threat detected by the threat detection module.

18 Claims, 9 Drawing Sheets

OTHER PUBLICATIONS

"Integration of Threat Information Into The Route (Re-) Planning Task", Theunissen & Bolderheij, Royal Netherlands Naval College, Helder, The Netherlands, Koeners, Delft University of Technology, Delft, The Netherlands—published Oct. 30, 2005.

"Concurrent Constraint Programming—Based Path Planning for Uninhabited Air Vehicles", Gualandi—Dept. of Computing Science & Engineering, Université Catholic de Louvain & Tranchero—Alenia Aeronautica—Advanced Information Technology Laboratory. published Sep. 1, 2004.

"Path Planning for UAVs In The Presence of Threat Zones Using Probabilistic Modeling", Pfeiffer—Institute of Applied Mathematics, University of Erlangen-Nuremburg, Batta—Department of Industrial Engineering, University at Buffalo SUNY), & Nagi—Department of Industrial Engineering, University at Buffalo (SUNY).—published Dec. 7, 2005.

"Routing Military Aircraft with a Constrained Shortest-Path Algorithm", Carlyle—Operations Research Department, Naval Postgraduate School, Monterey, California, Royset—Operations Research Department, Naval Postgraduate School, Monterey, California, & Wood—Operations Research Department, Naval Postgraduate School, Monterey, California.—published Apr. 17, 2007.

* cited by examiner

SURVIVABILITY SYSTEM

FIELD OF INVENTION

The present invention relates to a planning system for optimizing mission survivability. More particularly, the present invention relates to a system for planning a course of action in response to sensed situational conditions by utilizing data from specific timeline modeling.

BACKGROUND OF THE INVENTION

Conventional survivability systems are computer-based systems for detecting and navigating aircraft around detected threats. In planning the route of an aircraft's mission, known threats such as hostile ground fire, military positions, etc., are taken into account. The planned route, which may be stored in the aircraft's computer system, includes a starting point, a number of intermediate waypoints, and an ending point. The distance between each waypoint may be measured in nautical miles and referred to as a leg. Thus, a conventional planned route consists of a number of connected legs that angle around known threats to provide a safe route between the aircraft's starting point and its ultimate mission destination (endpoint). The conventional route is planned such that there is no "threat intervisibility," i.e., the aircraft being visible by the threat. Visible may include acoustic, visual, infrared, radar, or other suitable means of detection.

However, conventional route planning must also take into account the problem of unplanned threats, unknown at the time, which might "pop up" during the mission. When an unknown threat appears, steps must be taken to avoid detection by the threat without compromising the mission's objectives.

One conventional approach to this problem is inflexible. When an unknown threat pops up during a mission, the aircraft's computer system automatically directs the aircraft to change course and steer along one of a number of predetermined evasive legs. While the aircraft is changing course, the system attempts to recognize the threat and to calculate the intervisibility of the threat. If a planned route intersects the threat's intervisibility, then a route change is calculated from the end of the evasive leg to a next waypoint. If the proposed route change still intersects the threat's intervisibility, then a second route change is calculated from the end of the evasive leg to a following waypoint, and so forth. This approach limits the options of the aircraft operator, forces evasive maneuvers that are not optimized for an unknown threat, and is often slow.

Another conventional approach rapidly responds to unknown threats in a timely and safe manner. This approach provides quicker decisions when required for close-range threats and also flexibility to choose a response when time permits.

With this conventional approach, a previously unknown threat is detected. It is then determined whether the aircraft's planned route intersects intervisibility with the threat. If not, the planned route is maintained. If it is determined that the two will intersect, then the response depends on the current distance of the intersection from the aircraft. If the intersection is less than a predetermined distance, a route change is automatically executed. If the intersection is greater than the predetermined distance, the aircraft has time to maneuver and the aircraft operator is notified. Meanwhile, the severity of the threat is also checked against possible altitudes to determine if the planned route may be "cleared," i.e., maintained at a lower, acceptable flying altitude. If an acceptable altitude exists, the aircraft operator is permitted to choose between the planned route and an alternative route. Thus, the operator is permitted to manually respond to a threat where such permission does not endanger the aircraft.

These conventional approaches intend to prevent an intersection between a route of an aircraft and the detection capability of any possible threats. This is an absolute rule inherent in these approaches. These approaches do not consider the elapsed time required between initial detection of the aircraft by a threat and the threat's actually ability engage and fire upon the aircraft.

SUMMARY OF THE INVENTION

A system in accordance with the present invention determines a course of action for a vehicle. The system includes an altitude module, a threat detection module, a route module, and a threat avoidance module. The altitude module contains a list of types of threats. The list includes a predetermined threshold time for maximum safe visibility by the vehicle for each type. The threat detection module detects threats. The route module stores a planned route for the vehicle. The threat avoidance module determines types of threats detected by the threat detection module. The threat avoidance module utilizes the predetermined threshold times from the altitude module for each threat detected by the threat detection module to determine whether the planned route may safely enter visibility range of each threat detected by the threat detection module.

A computer program product in accordance with the present invention determines a course of action for a vehicle. The computer program product includes a first instruction for listing types of threats, each type including a predetermined threshold time for maximum safe visibility by the vehicle for each type; a second instruction for detecting threats; a third instruction for storing a planned route for the vehicle; a fourth instruction for determining types of the threats detected by the vehicle; and a fifth instruction for utilizing the predetermined threshold times for each threat detected by the vehicle to determine whether the planned route may safely enter visibility range of each threat detected by the vehicle.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF AN EXAMPLE EMBODIMENT

Figure 1:
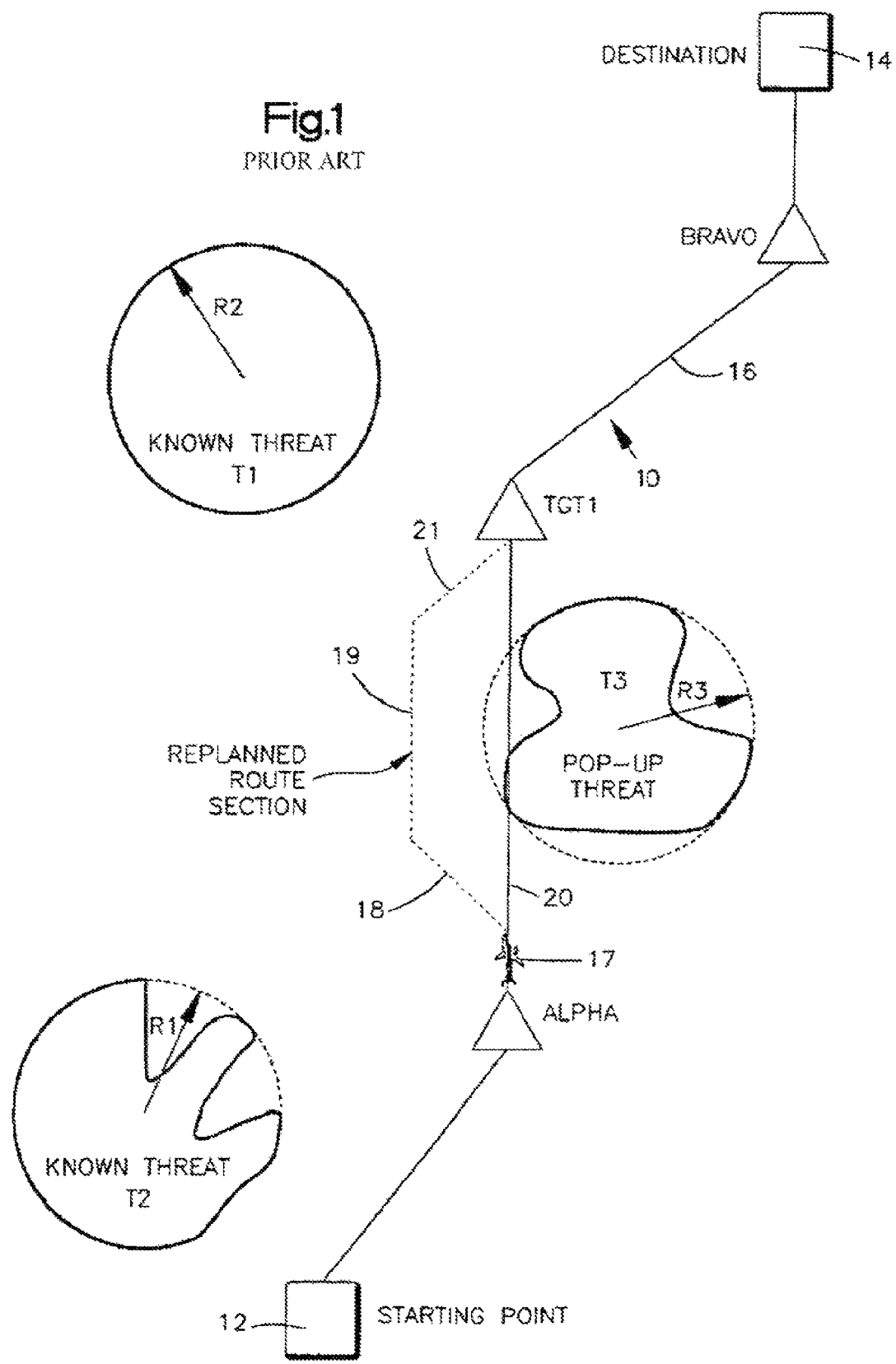
FIG. 1 is a schematic representation of an example reroute by a conventional system.

To better appreciate and understand the scope of the invention, an example of a conventional approach to the problem of avoiding previously unknown threats that appear without warning is described below. FIG. 1 illustrates known threats T1, an antiaircraft battery, and T2, a radar site, each having a maximum intervisibility range R1, R2, respectively. Intervisibility is the capability of both the threat and the aircraft to detect, or be visible to, each other. Ideally, the aircraft detects the threat before intersecting a threat's intervisibility.

However, the nature of the terrain may affect intervisibility. For example, R1 may not be circular because a mountain range may block the view of T1, an antiaircraft battery. A planned route 10 may include a starting point 12, an ending point or destination 14, and a number of intermediate waypoints such as Alpha, TGT1, and Bravo. Connecting each waypoint of the planned route is a leg, such as leg 16 between waypoints TGT1 and Bravo. A leg may have a general compass heading and be measured in nautical miles (NM) (i.e., a vector with length and direction). Thus, the complete planned route may be an articulated path, angling around known threats to avoid intersecting threat intervisibility regions.

When an unknown threat T3, such as a mobile missile site, pops up during a mission, one approach automatically changes the route of aircraft 17 along one of a number of predetermined evasive headings. The computer system calculates the intervisibility for the new threat while the aircraft changes course to the new route.

In the example of FIG. 1, aircraft 17 is just beyond the waypoint Alpha when T3 is encountered. If the threat's maximum intervisibility radius R3 may intersect the route, aircraft 17 is automatically steered along evasive leg 18. A new leg or legs 19, 21 are then plotted from the end of the evasive leg 18 to the next waypoint TGT1. These legs 18, 19, 21 are checked to determine if they intersect the intervisibility radii of threats T1, T2, T3. If the new legs 18, 19, 21 do intersect a threat, then another leg may be plotted from the end of the evasive leg 18 to the following waypoint Bravo (not shown). This may continue until a non-intersecting leg(s) are found.

The example approach of FIG. 1 limits the options of an aircraft operator, who may be a pilot or an additional navigator. An initial, automatic route change may be made before a determination of the intervisibility of the previously unknown threat actually intersects the planned route. For example, the intervisibility of T3 does not actually intersect the originally planned leg 20. This approach may produce unnecessarily large evasive maneuvers (18, 19, 21). This approach may further be relatively slow because an excessive number of route changes may be calculated in the pursuit of a safe route.

FIGS. 2 and 3A-3C are an example architectural view and flow charts of another conventional approach implemented by software within an aircraft's computer system. FIGS. 4A-4B are example schematic illustrations of the operation of the approach.

Figure 2:
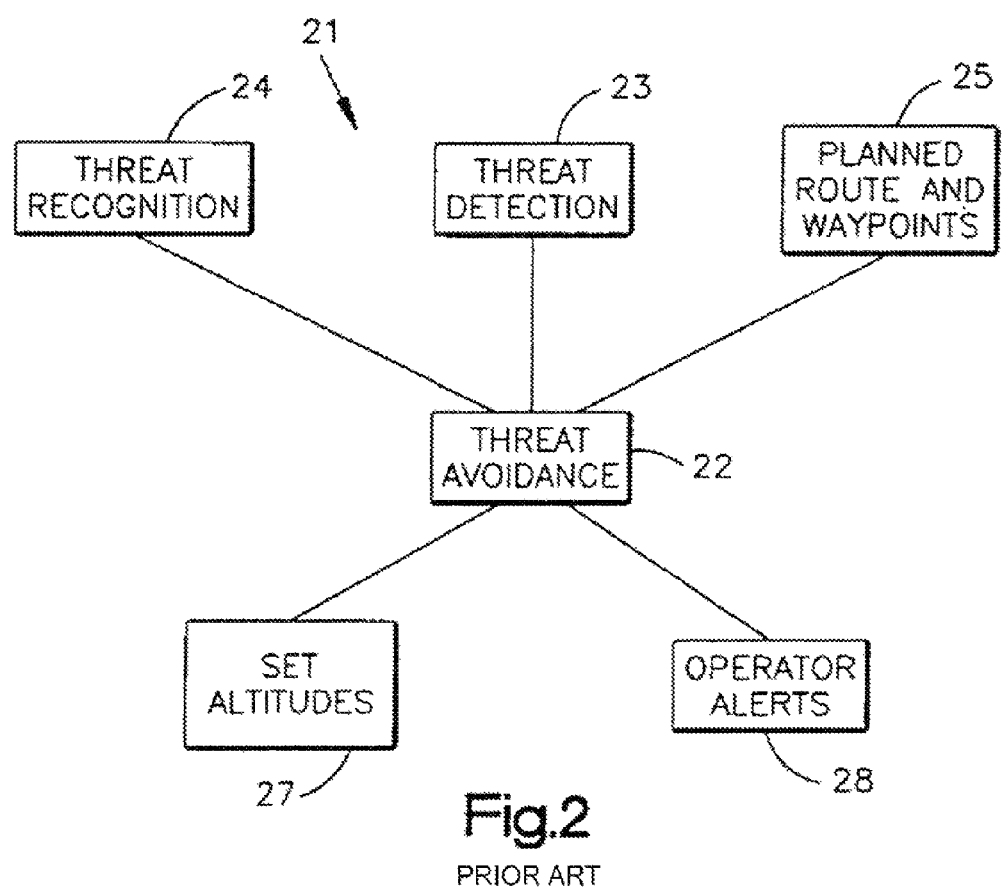
FIG. 2 is a schematic representation of a system in accordance with the present invention.

In FIG. 2, a system 21 includes a threat avoidance module 22 that executes steps as described below. The module 22 communicates with a threat detection module 23 that detects new, previously unknown threats, a threat recognition module 24 that contains data about the type of threats and determines from the detection data what type of threat is detected, and a planned route and waypoints module 25 that contains data on the planned route. A set altitudes module 27 contains threat data on the various set altitudes. An operator alerts module 28 aids in communicating data to an aircraft operator.

Figure 3A:
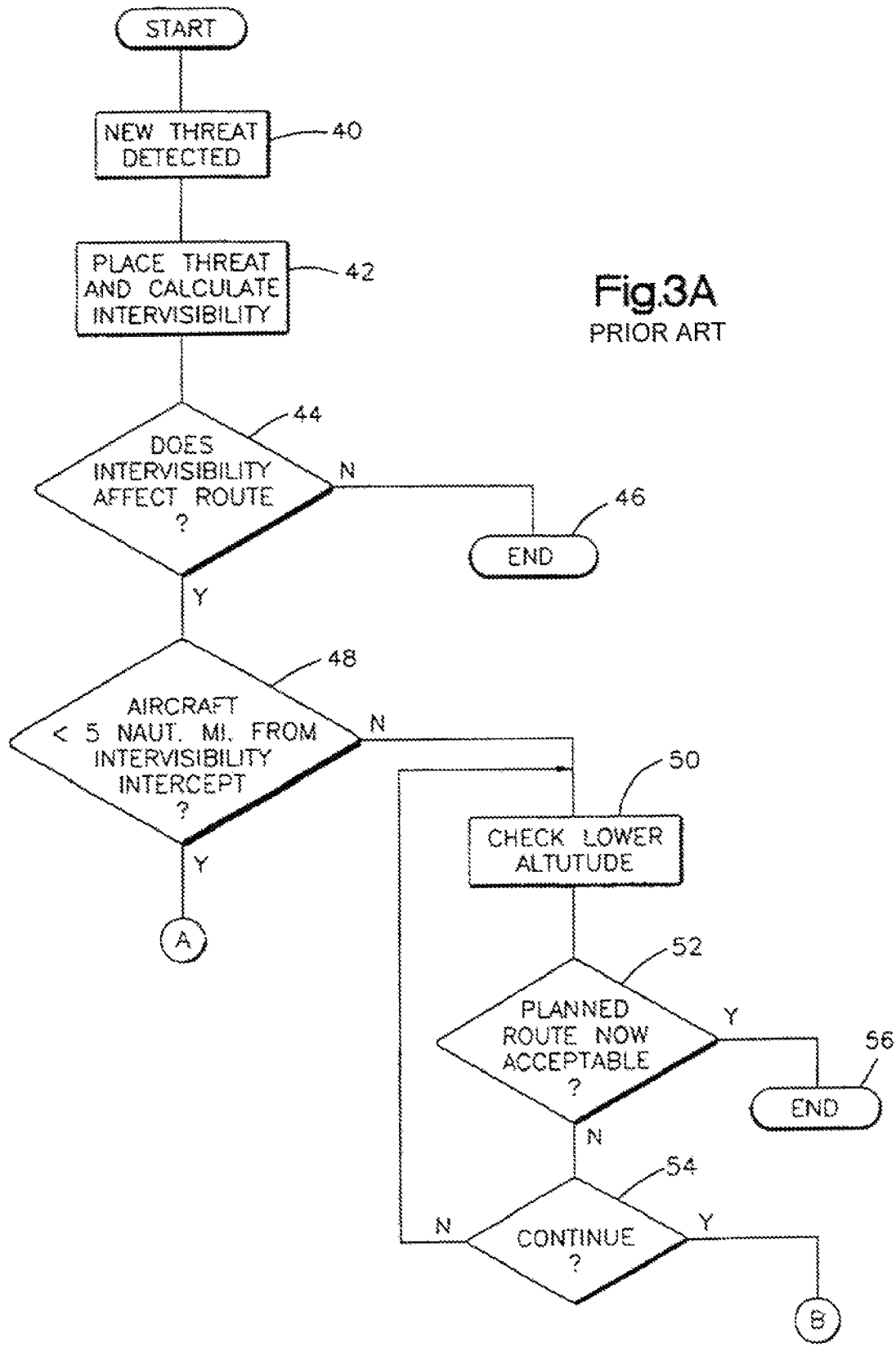
FIGS. 3A-3C are a schematic representation of a conventional threat avoidance process.
Figure 4B:
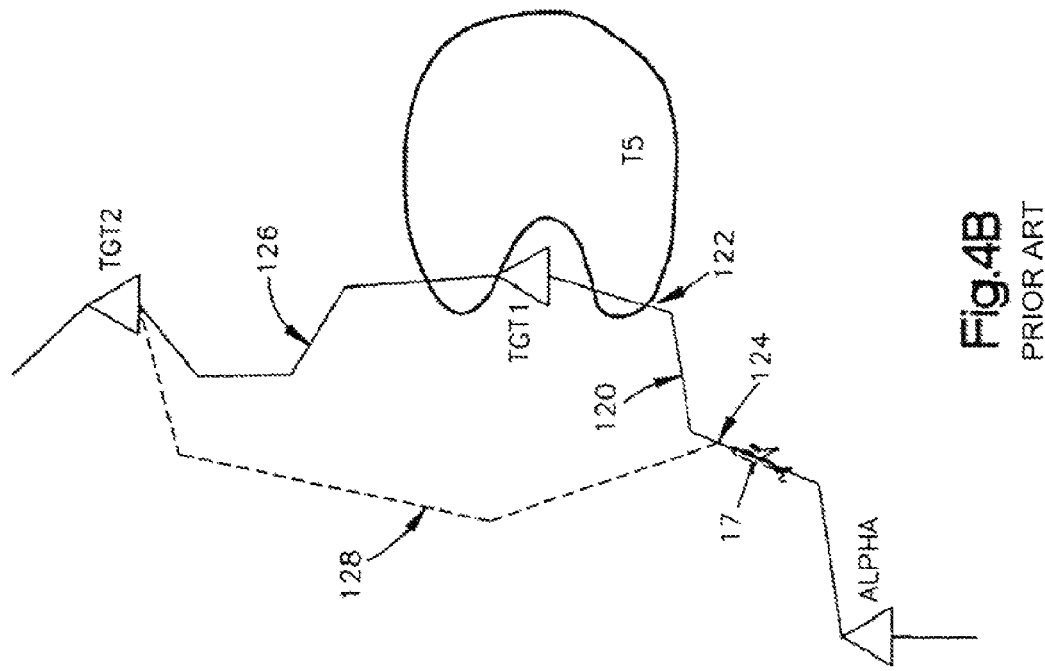
FIGS. 4A and 4B are a schematic representation of another example reroute by another conventional system.
Figure 4A:
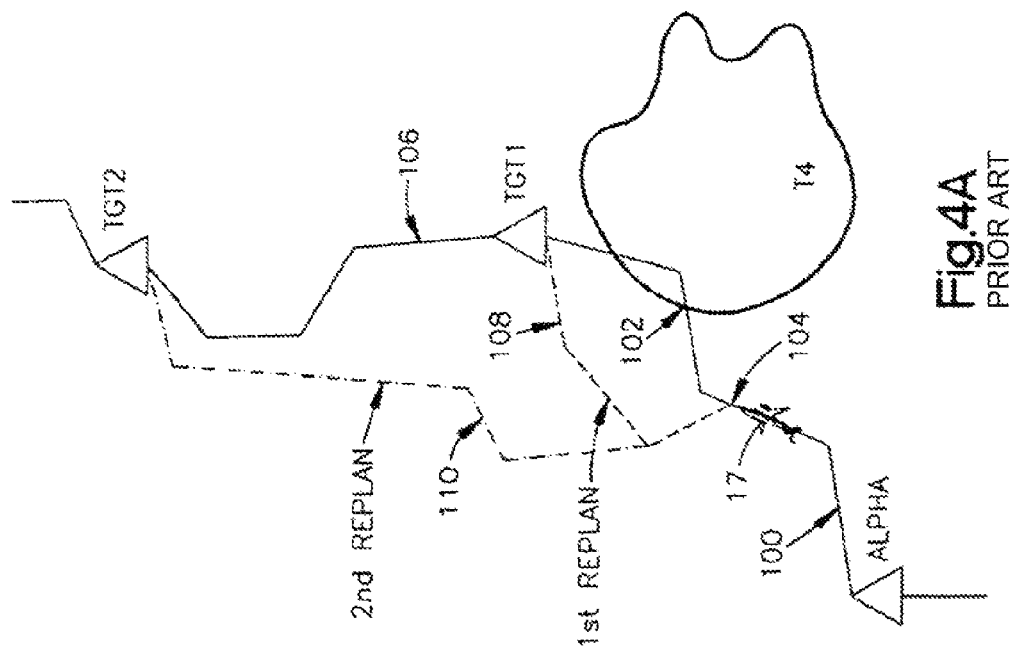

In FIG. 3A, in step 40, the threat avoidance module 22 operates when a new, previously unknown threat is detected and recognized by the aircraft's computer system. In step 42, the threat is located and its intervisibility is calculated in nearly real time. In step 44, the planned route is checked to determine if it is affected by the new threat's intervisibility, i.e., the planned route intersects the threat's intervisibility at the current altitude. If the planned route is not affected by the threat's intervisibility, then threat avoidance is complete at step 46.

However, in step 48, if the planned route is affected, then a check is made to determine if the intervisibility intersection point is less than a predetermined distance from the aircraft, for example 5 NM. Step 48 allows the aircraft operator to decide what action to take if there is sufficient time for him to do so.

Figure 3B:
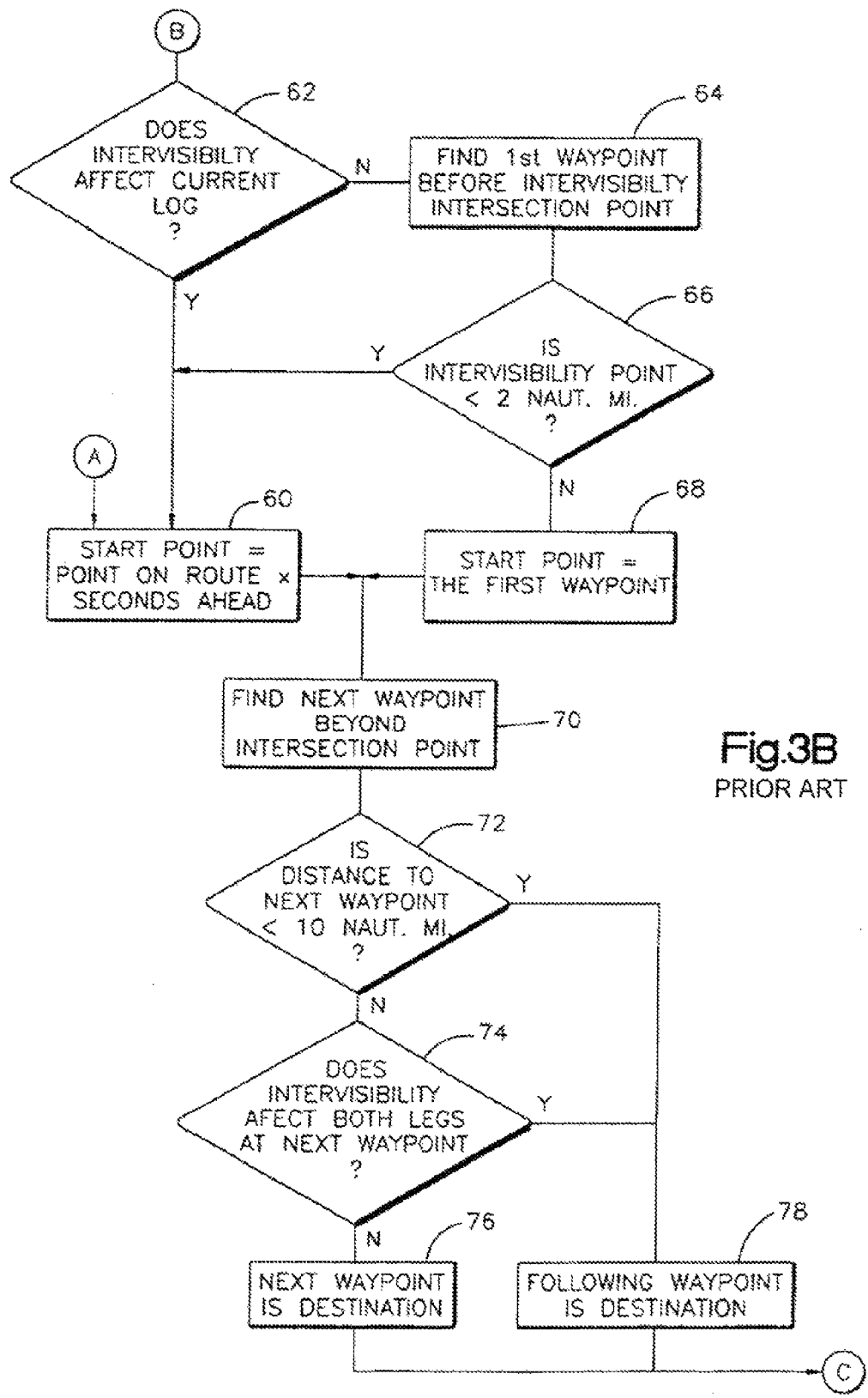
Figure 3C:
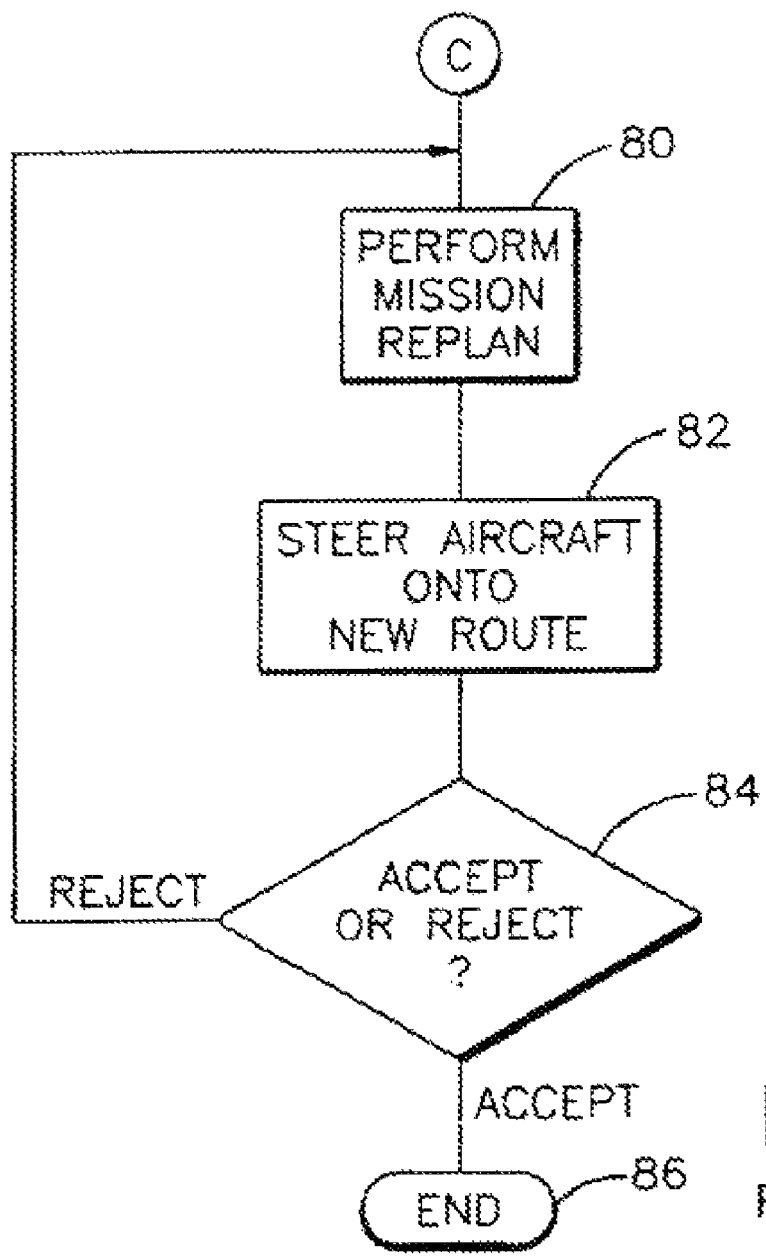

If the intersection point is too close, then a mission replan is executed at the current altitude (step A in FIG. 3A and following steps in FIGS. 3B and 3C). If there is sufficient time for operator involvement, the operator may be advised of the situation and the route may be checked against remaining that may hide the aircraft from the threat because of a terrain blockage, etc.

A check may be made to see if there is another altitude acceptable to the operator, given the nature of the threat (steps 50-54 in FIG. 3A). If so, in step 56, the operator may terminate the threat avoidance and direct the aircraft to continue on the planned route, advisably at some lower altitude. If there is no other acceptable altitude, then the operator executes a mission replan (step 62 in FIG. 3B and following steps in FIGS. 3B and 3C).

In FIG. 3B, the system 21 may perform a mission replan. In step 60, in response to a new threat and a situation where a replan, or route change, is automatic, a startpoint for a new leg is on the current leg a few seconds ahead of the aircraft (the time varies based on aircraft performance). For the situation where an operator is involved, a startpoint may differ. In step 62, if the intervisibility of the new threat intersects the current leg of the planned route, then the startpoint is also on the current leg a few seconds ahead of the aircraft. However, in step 64, if the intervisibility does not intersect the current leg, the system 21 may determine the first waypoint before the intersection point. In step 66, if first waypoint is within a predetermined distance of the intersection point, the startpoint is again on the current leg a few seconds ahead of the aircraft and the system proceeds to step 60.

If not, in step 68, the first waypoint becomes the startpoint. Thus, the startpoint for the route change is already a point on the current leg a few seconds ahead of the aircraft, unless it is safe for the aircraft to proceed to the first waypoint ahead, i.e., at the end of the current leg.

The destination, or endpoint, of the route change is then calculated and becomes the next sequential waypoint following the startpoint. In step 70, the system 21 determines the next waypoint beyond the intervisibility intersection point. For a startpoint on the current leg, the next waypoint would be the waypoint at the end of the current leg. For a startpoint at the first waypoint, the next waypoint would be the waypoint immediately beyond the first waypoint. In steps 72, 74, 76, this next waypoint becomes the destination.

However, in step 72, if the next waypoint is less than another predetermined distance from the aircraft, or, in step 74, if the threat's intervisibility intersects both legs connecting to the next waypoint, then in step 78, the following waypoint is the destination. Steps 72 and 74 minimize the number of route changes by ensuring that one route change is sufficient to avoid a new threat.

In FIG. 3C, in step 80, the threat avoidance module 22 executes the mission replan and, in step 82, commands the aircraft to steer to the route change. This optimized evasive action, which is preferably automatic, may occur adequately after a new threat is detected. In step 84, the operator may accept or reject the replan. If the operator rejects the replan, the operator may command the system 21 to select an alternative route. Or, in step 86, the operator may accept the replan and terminate the process.

FIGS. 4A and 4B are examples illustrating the operation of the conventional threat avoidance system 21. In FIG. 4A, a threat T4 pops up and intersects a current leg 100 at a current altitude (step 44 in FIG. 3A). The aircraft 17 is less than 5 NM (step 48 in FIG. 3A) from intersection point 102 and the intervisibility affects the current leg (step 62 in FIG. 3B). A startpoint 104 is thus automatically selected a few seconds ahead (step 60 in FIG. 3B). TGT1 is the next waypoint beyond the intersection point 102 (step 70 in FIG. 3B) and the aircraft distance to it is greater than 10 NM (step 72 in FIG. 3B). The intervisibility does not affect both legs 100, 106 at TGT1 (step 74 in FIG. 3B), so TGT1 is selected as a destination waypoint (step 76 in FIG. 3B). A replan is performed (step 80 in FIG. 3C) and the aircraft is steered onto a new leg 108 (step 82 in FIG. 3C). If the operator decides the route to TGT1 is acceptable (step 84 in FIG. 3C), the operator may "accept," and processing is complete (step 86 in FIG. 3C). If the operator rejects the route (step 84 in FIG. 3), TGT2 is selected as the destination waypoint and a replan is made along another leg 110 to TGT2. Typically, the operator would accept this replan and processing would again be complete, as described above.

In FIG. 4B, a threat T5 pops up and intersects leg 120 further along the aircraft's route. The distance from aircraft 17 to intersection point 122 is greater than 5 NM (step 48 in FIG. 3A). The operator now has the option to select a lower altitude (step 50 in FIG. 3A) (altitude) which the threat intervisibility does not intersect. The planned route may remain acceptable (step 52 in FIG. 3A) and processing may be complete (step 56 in FIG. 3A). If, however, the operator desires a new route, processing may continue (step 54 in FIG. 3A). Since the intervisibility affects the current leg 120 (step 62 in FIG. 3B), a startpoint 124 is chosen a few seconds ahead of the aircraft (step 60 in FIG. 3B). TGT1 is the next waypoint beyond the intersection (step 70 in FIG. 3B) and the distance to it is greater than 10 NM (step 72 in FIG. 3B). However, the threat's intervisibility affects both legs 122 and 126 (step 74 in FIG. 3B), so TGT2, the following waypoint, is selected as the destination waypoint (step 78 in FIG. 3B. Only one replan is performed (step 80 in FIG. 3C) to generate a new leg 128, minimizing the amount of operator interaction required.

As stated above, the conventional route planning system of FIGS. 1-4 defines larger areas around threats that are considered "dangerous" for friendly force operation. The maximum weapons range of the threat is used to define the radius of these areas, which defines large areas of "denied operation". This over simplification of the threat capability may hinder, if not completely deny, desirable mission routes. This simple "threat dome" approach does not take into account the amount of time needed for threats to perform the required tasks associated with engaging a target.

Figure 5:
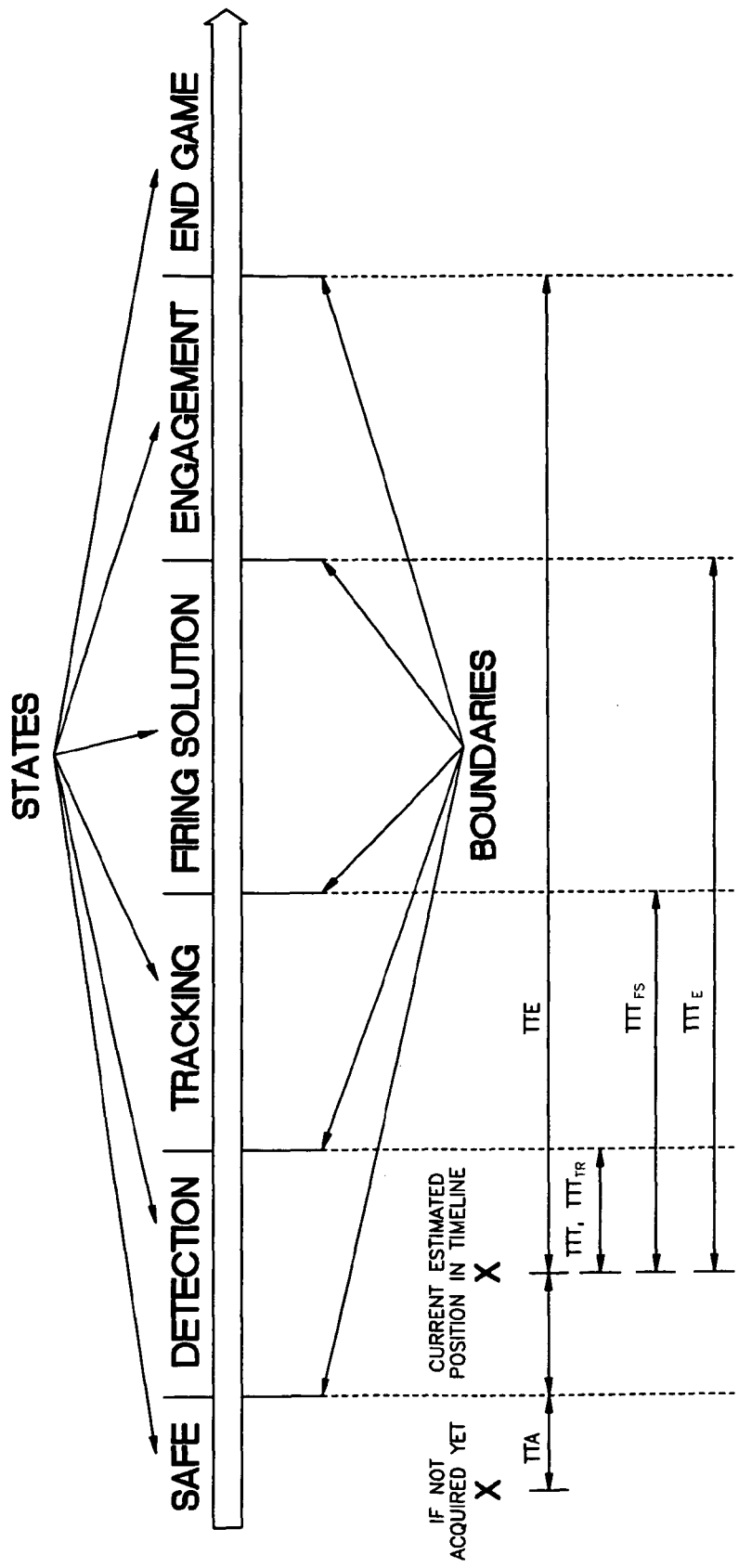
FIG. 5 is a schematic representation of an example threat engagement timeline for use with a system in accordance with the present invention.
Figure 6:
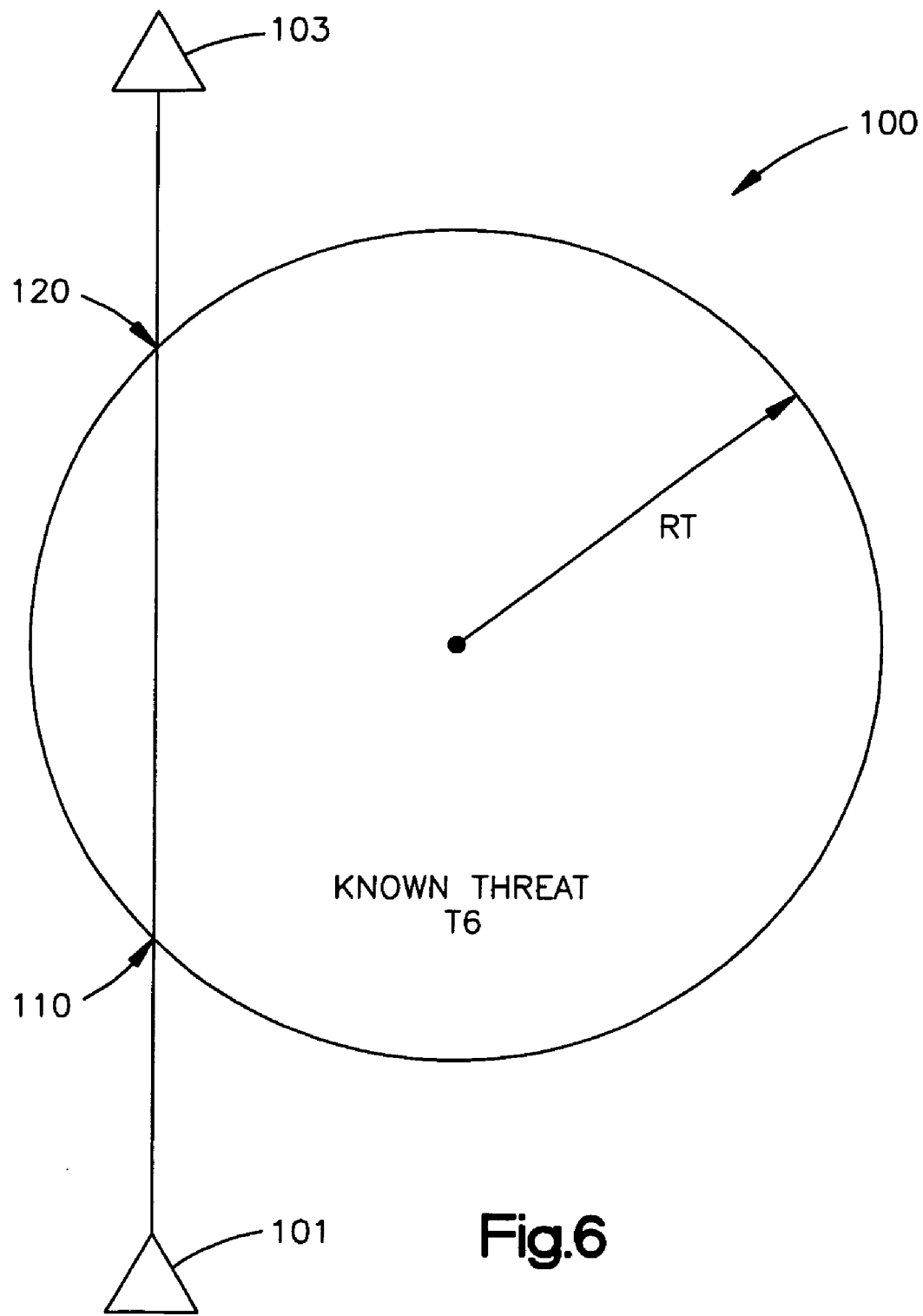
FIG. 6 is a schematic representation an example maintenance of a route in accordance with a system in accordance with the present invention.

However, a system 100 in accordance with the present invention may provide a means for including engagement time in planning survivable aircraft routes. As shown in FIG. 6, the system 100 may utilize a threat engagement timeline model, such as the example timeline of FIG. 5, to consider the inability of threats to act instantaneously.

Specifically, each threat type may have a finite amount of time required to perform tasks associated with engaging an aircraft. Against any given threat, the aircraft may safely be exposed for a limited amount of time that is less than the time required for the threat to engage. With this new exposure flexibility, the system 100 may create new, survivable route possibilities that have been previously considered too "dangerous" by conventional systems. The system 100 may provide a route planning cellular cost function with a time-dependent cost of being exposed to a threat. The system 100 may incorporate this selection of exposure time with a variable risk to determine how close an aircraft may get to a potential engagement. Conventional systems do not utilize threat timelines when planning survivable routes.

Thus, the system 100 may include threat exposure time as a "weight" in the cost of crossing threat areas. The system 100 may consider routes that allow limited amount of threat exposure time, resulting in more direct and useful route solutions.

For example, in FIG. 6, if the amount of time that it takes for the aircraft to traverse from point 110 to point 120 is less than an predetermined allowable threat exposure time, the system 110 may allow the illustrated direct route from waypoint 101 to waypoint 103. The system 100 will thus consider the speed of the aircraft when making the determination.

Figure 7:
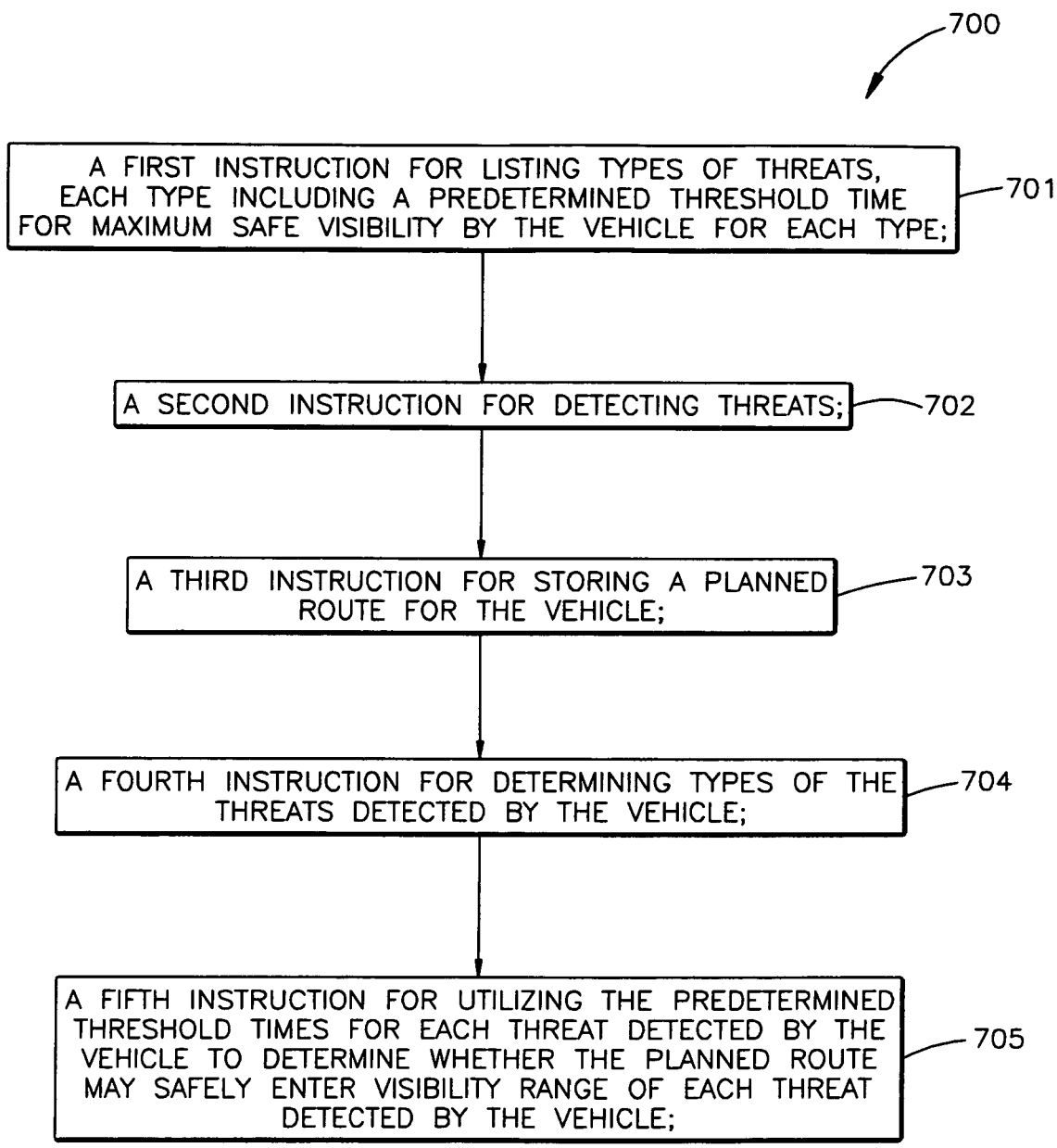
FIG. 7 is a schematic representation of an example computer program product in accordance with the present invention.

As shown in FIG. 7, an example computer program product 700 determines a course of action for a vehicle 17. The computer program product 700 includes: a first instruction 701 for listing types of threats, each type including a predetermined threshold time for maximum safe visibility by the vehicle for each type; a second instruction 702 for detecting threats; a third instruction 703 for storing a planned route for the vehicle; a fourth instruction 704 for determining types of the threats detected by the vehicle; and a fifth instruction 705 for utilizing the predetermined threshold times for each threat detected by the vehicle to determine whether the planned route may safely enter visibility range of each threat detected by the vehicle.

In order to provide a context for the various aspects of the present invention, the following discussion is intended to provide a brief, general description of a suitable computing environment in which the various aspects of the present invention may be implemented. While the invention has been described above in the general context of computer-executable instructions of a computer program that runs on a computer, those skilled in the art will recognize that the invention also may be implemented in combination with other program modules.

Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications argument model. However, some, if not all aspects of the invention can be practiced on stand-alone computers. In a distributed computing environment, program modules may be located in both local and remote memory storage devices.

An exemplary system for implementing the various aspects of the invention includes a conventional server computer, including a processing unit, a system memory, and a system bus that couples various system components including the system memory to the processing unit. The processing unit may be any of various commercially available processors. Dual microprocessors and other multi-processor architectures also can be used as the processing unit. The system bus may be any of several types of bus structure including a memory bus or memory controller, a peripheral bus, and a local bus using any of a variety of conventional bus architectures. The system memory includes read only memory (ROM) and random access memory (RAM). A basic input/output system (BIOS), containing the basic routines that help to transfer information between elements within the server computer, such as during start-up, is stored in ROM.

The server computer further includes a hard disk drive, a magnetic disk drive, e.g., to read from or write to a removable disk, and an optical disk drive, e.g., for reading a CD-ROM disk or to read from or write to other optical media. The hard disk drive, magnetic disk drive, and optical disk drive are connected to the system bus by a hard disk drive interface, a magnetic disk drive interface, and an optical drive interface, respectively. The drives and their associated computer-readable media provide nonvolatile storage of data, data structures, computer-executable instructions, etc., for the server computer. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM, including an operating system, one or more application programs, other program modules, and program data. A user may enter commands and information into the server computer through a keyboard and a pointing device, such as a mouse. Other input devices (not shown) may include a microphone, a joystick, a game pad, a satellite dish, a scanner, or the like. These and other input devices are often connected to the processing unit through a serial port interface that is coupled to the system bus, but may be connected by other interfaces, such as a parallel port, a game port or a universal serial bus (USB). A monitor or other type of display device is also connected to the system bus via an interface, such as a video adapter. In addition to the monitor, computers typically include other peripheral output devices (not shown), such as speaker and printers.

The server computer may operate in a networked environment using logical connections to one or more remote computers, such as a remote client computer. The remote computer may be a workstation, a server computer, a router, a peer device or other common network node, and typically includes many or all of the elements described relative to the server computer. The logical connections include a local area network (LAN) and a wide area network (WAN). Such networking environments are commonplace in offices, enterprise-wide computer networks, intranets and the internet.

When used in a LAN networking environment, the server computer is connected to the local network through a network interface or adapter. When used in a WAN networking environment, the server computer typically includes a modem, or is connected to a communications server on the LAN, or has other means for establishing communications over the wide area network, such as the internet. The modem, which may be internal or external, is connected to the system bus via the serial port interface. In a networked environment, program modules depicted relative to the server computer, or portions thereof, may be stored in the remote memory storage device.

It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the server computer, unless otherwise indicated. Such acts and operations are sometimes referred to as being computer-executed. It will be appreciated that the acts and symbolically represented operations include the manipulation by the processing unit of electrical signals representing data bits which causes a resulting transformation or reduction of the electrical signal representation, and the maintenance of data bits at memory locations in the memory system (including the system memory, hard drive, floppy disks, and CD-ROM) to thereby reconfigure or otherwise alter the computer system's operation, as well as other processing of signals. The memory locations where such data bits are maintained are physical locations that have particular electrical, magnetic, or optical properties corresponding to the data bits.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

Having described the invention, we claim:

1. A computer program product for determining a course of action for a vehicle, said computer program product comprising:
   a first instruction for listing types of threats, each type including a predetermined threshold time for maximum safe visibility by the vehicle for each type;
   a second instruction for detecting threats;
   a third instruction for storing a planned route for the vehicle;
   a fourth instruction for determining types of the threats detected by the vehicle;
   a fifth instruction for utilizing the predetermined threshold times for each threat detected by the vehicle to determine whether the planned route may safely enter visibility range of each threat detected by the vehicle; and
   a sixth instruction for determining a first elapsed time that the planned route brings the vehicle within the visibility range of a first threat detected by the vehicle.

2. The computer program product as set forth in claim 1 further including a seventh instruction for determining whether the first elapsed time is less than a predetermined threshold time of the first threat.

3. The computer program product as set forth in claim 2 further including an eighth instruction for maintaining the planned route of the vehicle if the first elapsed time is less than the predetermined threshold time of the first threat.

4. The computer program product as set forth in claim 2 further including an eighth instruction for rerouting the vehicle out of visibility of the first threat if the first elapsed time is greater than the predetermined threshold time of the first threat.

5. The computer program product as set forth in claim 1 further including a seventh instruction for determining a second elapsed time that the planned route brings the vehicle within the visibility range of a second threat detected by the vehicle.

6. The computer program product as set forth in claim 5 further including an eighth instruction for determining whether the second elapsed time is less than a predetermined threshold time of the second threat.

7. The computer program product as set forth in claim 6 further including a ninth instruction for maintaining the planned route of the vehicle if the second elapsed time is less than the predetermined threshold time of the second threat.

8. The computer program product as set forth in claim 6 further including a ninth instruction for rerouting the vehicle out of visibility of the second threat if the second elapsed time is greater than the predetermined threshold time of the second threat.

9. The computer program product as set forth in claim 8 further including a tenth instruction for alerting an operator of the vehicle of a deviation from the planned route.

10. A non-transitory computer readable medium storing executable instructions for performing a method for determining a course of action for a vehicle, the method comprising the steps of:
  listing a plurality of types of threats and a predetermined threshold time for maximum safe visibility by the vehicle for each of the plurality of types;
  detecting at least one threat;
  storing a planned route for the vehicle;
  determining an associated type of the plurality of types of threats for each of the detected at least one threat;
  utilizing the predetermined threshold times associated with the determined threat type for each of the detected at least one threat module to determine whether the planned route may safely enter a visibility range of each of the at least one threat; and
  determining a first elapsed time that the planned route brings the vehicle within a visibility range of a first threat of the at least one threat.

11. The non-transitory computer readable medium as set forth in claim 10, the method further comprising determining whether the first elapsed time is less than a predetermined threshold time of the first threat.

12. The non-transitory computer readable medium as set forth in claim 11, the method further comprising maintaining the planned route of the vehicle if the first elapsed time is less than the predetermined threshold time of the first threat.

13. The non-transitory computer readable medium as set forth in claim 11, the method further comprising rerouting the vehicle out of the visibility range of the first threat if the first elapsed time is greater than the predetermined threshold time of the first threat.

14. The non-transitory computer readable medium as set forth in claim 10, the method further comprising determining a second elapsed time that the planned route brings the vehicle within a visibility range of a second threat of the at least one threat.

15. The non-transitory computer readable medium as set forth in claim 14, the method further comprising determining whether the second elapsed time is less than a predetermined threshold time of the second threat.

16. The non-transitory computer readable medium as set forth in claim 15, the method further comprising maintaining the planned route of the vehicle if the second elapsed time is less than the predetermined threshold time of the second threat.

17. The non-transitory computer readable medium as set forth in claim 15, the method further comprising rerouting the vehicle out of visibility of the second threat if the second elapsed time is greater than the predetermined threshold time of the second threat.

18. The non-transitory computer readable medium as set forth in claim 10, the method further comprising communicating a deviation from the planned route to an operator of the vehicle.

* * * * *